Patented Aug. 25, 1942

2,294,233

UNITED STATES PATENT OFFICE 2,294,233

COSMETIC PREPARATION

Benjamin R. Harris, Chicago, Ill.

No Drawing. Original application February 27, 1937, Serial No. 128,273. Divided and this application June 29, 1939, Serial No. 281,851

5 Claims. (Cl. 167—85)

My invention relates in general to cosmetic preparations in the form of water-oil emulsions.

In the art of making such water-in-oil emulsions and oil-in-water emulsions, it is customary to bring the ingredients into intimate contact with each other by shaking, agitating, beating, homogenizing, grinding, working in a colloid mill or using some other means for the purpose of sub-dividing the disperse phase in intimate contact with the continuous phase, and, generally speaking, in the presence of a suitable emulsifying agent. Some of the better known emulsions of this kind are, for example, vanishing creams which comprise stearic acid emulsified with potassium or sodium soap in water, and cold creams which essentially are emulsions of oleaginous materials with soap and water. These and similar emulsions are generally made with vegetable, animal or mineral oils and fats, which are, for all practical purposes, immiscible with water and aqueous liquids.

The stabilities of these emulsions vary, but on aging, sooner or later, they reach a point where an appreciable separation of one or the other phase or both phases commences to become noticeable. The ease with which this deterioration sets in is dependent upon a number of factors—the relative proportion of emulsifying agent; character of the emulsifying agent; the thoroughness of initial emulsification; storage conditions, etc.

One of the principal objects of my invention is to stabilize cosmetic emulsions of this general character.

I have found that cosmetic emulsions of the general character described above as well as other cosmetic emulsions comprising oleaginous and/or fatty materials and water or aqueous liquids may be appreciably improved by the introduction of a proportion of certain types of materials, which I designate as hydrophyllic lipins and which are described in greater detail hereinafter. In certain cases, if desired, the oleaginous substance may be entirely replaced by hydrophyllic lipins.

One of the principal differences between my hydrophyllic lipins and the oleaginous substances used heretofore in water and oil emulsions is that my substances have a more or less marked affinity for water and aqueous liquids, whereas the oleaginous substances used heretofore, such as corn oil, cotton seed oil, various marine oils, linseed oil, tung oil, oleo oil, beef stearine, turpentine, liquid paraffin, etc., are distinctly immiscible with water, are not readily wetted by water to any appreciable extent and do not show the affinity for water, which characterizes, in part, my hydrophyllic lipins.

Generally speaking, the hydrophyllic properties of my lipins manifest themselves by capacity, in varying degrees, to imbibe water, to be wetted by water and, in some cases, to foam or froth with water. It is common knowledge to those skilled in the art that the fats and oils used heretofore are, generally speaking, notably deficient in this capacity.

In general, my hydrophyllic lipins are characterized by the presence of a group of moderately high molecular weight, say, from about six carbons up, and of predominantly oleaginous or hydrocarbon characteristics, which imparts its strictly oleaginous character to a portion of the hydrophyllic lipin molecule and another group, or association of groups, of relatively smaller molecular weight with at least one unesterified hydroxyl group attached to carbon and with distinctly hydrophyllic characteristics; that is, a group which imparts to the molecule as a whole a certain degree of affinity for water and aqueous media not possessed by the oleaginous materials such as linseed oil, lard, petrolatum, soy bean oil, etc., heretofore used in oil and water emulsions.

Some of my hydrophyllic lipins which are of particular value are the following:

1,6-dilauryl diglycerol
Mono melissyl ester of diethylene glycol
Mono oleyl diglycerol
Mono-abietic acid ester of triglycerol
Mono stearyl glycerol
Mono cetyl ether of glycerol
Mono oleyl glycerol
Di ethylene glycol mono-stearate An example of the way in which my invention may be carried out in the manufacture of vanishing cream is as follows:

|  | Grams |
|---|---|
| Rosewater | 1400 |
| Glycerine | 300 |
| Stearic acid | 120 |
| Potassium hydroxide | 12 |
| Monostearyl ester of diethylene glycol | 60 |

The ingredients, exclusive of the lipin, are warmed, (to saponify), and agitated together in the usual order and manner by means of a suitable stirring apparatus or a colloid mill. Finally, while still warm, this mixture is treated with the hydrophyllic lipin with stirring. A suitable amount of coloring and scent material may be added. Other ingredients may also be added such as zinc oxide or other medicaments may be incorporated. Starch may also be incorporated to give the product whitening qualities.

The mono stearyl diethylene glycol used in connection with the above product will give the finished product a good texture, greater resistance to syneresis and excellent spreading value on the skin.

Hydrophyllic lipins can also be used in the preparation of cold creams. Where lanolin is used, the lanolin may be entirely or partially substituted with hydrophyllic lipins. In formulae where beeswax is used, this product may also be substituted in part or in whole with lipin.

In cosmetic cold cream formulae, which contain a proportion of white vaseline or oils or fats, a part of the fatty ingredient may be substituted with the hydrophyllic lipin to give desirable results. Thus, for example, in the following formula:

| | | |
|---|---|---|
| Stearic acid | grams | 1000 |
| Lard | do | 200 |
| Ammonia water sp. g. 0.880 | cubic centimeters | 100 |
| Distilled water | do | 7700 |
| Scent | | | the lard may be advantageously replaced by 200 grams of monostearyl diglycerol. When this change is made, the saponification of the stearic acid with the ammonia is preferably carried out first, after which the lipin is introduced; in other respects, the usual procedure for making a face cream of this type may be followed.

It will seem that one outstanding characteristic of the constitutional structure of my hydrophyllic lipins is that the fatty character of the otherwise oleaginous molecule is partly offset and attenuated by the presence of hydrophyllic hydroxyl groups attached to carbon. The extent of this effect, however, is not so great as to render the lipin freely miscible with certain aqueous media as is the case for example with the ordinary "sulphonated" oils of commerce.

I have found that the degree of the attenuation of the oleaginous characteristics is by no means the same in different hydrophyllic lipins, but that it varies, among other things, first: with the number and character of the hydroxyl groups present, and second; with the mass and character of the oleaginous group or groups. The illustrations given below will serve to make these two points clear:

Of the following three substances:

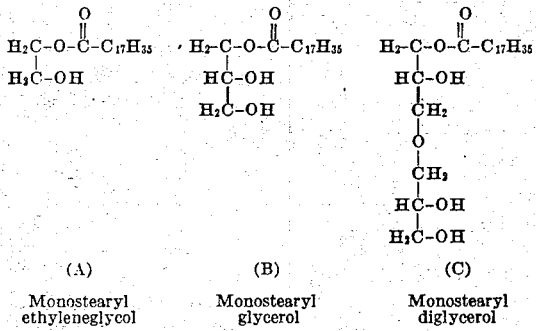

(A) Monostearyl ethyleneglycol  (B) Monostearyl glycerol  (C) Monostearyl diglycerol A is the least hydrophyllic and C the most pronouncedly hydrophyllic. It will be observed that while the fatty residue is constant throughout, the number of hydrophyllic groups increases going from A to C.

Secondly, in the following three hydrophyllic lipins:

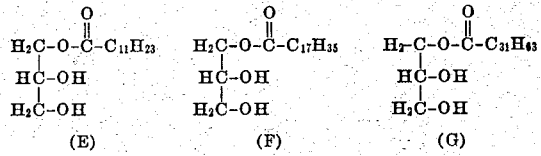

(E) Monolauryl glycerol  (F) Monostearyl glycerol  (G) Monomelissyl glycerol

E is relatively more hydrophyllic than F and F in turn is more hydrophyllic than G: the hydrophyllic group is the same throughout but the oleaginous character is asserted least in E by the relatively small lauryl group.

It will thus be understood by those skilled in the art, that my invention embraces a broad class of materials of varying degrees of fatty and hydrophyllic characteristics. The particular purpose for which a hydrophyllic lipin is to be used will, in general, in a large measure, govern the decision as to which lipin should be employed.

It is by no means to be understood that my hydrophyllic lipins are limited to the particular substances specifically named in this specification by way of example. Many organic water soluble polyhydroxy substances such as glycerol, polyglycerols, glycols, polyglycols, such as diethyleneglycol, sugars, mannitol, sorbitol and other polyhydroxy alcohols and various other water soluble polyhydroxy substances may be used in which one or more than one hydroxyl is converted to an ether or ester group. These ether and ester groups are preferably high or moderately high molecular weight, say, from $C_6$ up.

In general, the hydrophyllic character of a given substance may be considerably increased by esterifying one or more of its hydroxyl groups with sulphuric acid. The product so produced may be used for the purposes of my invention and is contemplated thereby, particularly when it is produced in the form of a solid as described in my co-pending application.

Throughout this specification, I have used the prefix "poly" to denote more than one.

I have disclosed the details of my invention in considerable detail so that those skilled in the art may be able to practice the same. I wish to point out, that in the use of the hydrophyllic lipins of the character set forth, with a given emulsion, a selection should be made in accordance with the emulsion product manufactured. The most pronouncedly hydrophyllic lipin is not necessarily always of most value.

The chemical substances which I employ in accordance with my invention may be represented by the general formula $$(RO)_v X(OH)_w (H)_z$$

wherein O and H are oxygen and hydrogen respectively, $v$, $w$ and $z$ are relatively small whole numbers, X represents the carbon skeleton of a polyhydroxy substance with groups (OH) and (RO), wherein R is an acyl, alkyl or some other substantially lipophillic group, and wherein the ratio of $w$ to $v$ is at least one.

It is obvious for the reasons stated, that the invention is not limited in any respects, except within the scope of the appended claims.

My present application is a division of my co-pending application, Serial No. 128,273, filed February 27, 1937, which latter application is a division of my earlier filed case, Serial No. 431,964, filed February 27, 1930, now Patent No. 2,109,842.

What I claim as new and desire to protect by Letters Patent of the United States is:

1. A cosmetic preparation adapted for application to the face, said preparation being essentially devoid of the tendency to lather, comprising a normally solid oleaginous material, aqueous material, soap, and a proportion of a member selected from the group consisting of glycols and polyglycerols, partially esterified with a higher molecular weight carboxylic acid.

2. A cosmetic preparation adapted for application to the face, said preparation being essentially devoid of the tendency to lather, comprising a normally solid higher molecular weight fatty acid, aqueous material, soap, and a proportion of a member selected from the group consisting of glycols and polyglycerols, partially esterified with a higher molecular weight fatty acid.

3. A cosmetic preparation in accordance with claim 2 wherein the normally solid higher molecular weight fatty acid comprises stearic acid.

4. A cosmetic preparation adapted for application to the face, said preparation being essentially devoid of the tendency to lather, comprising stearic acid, aqueous material, soap, and a proportion of a higher fatty acid ester of a polyglycerol, said ester having at least one free polyglycerol hydroxy group.

5. A cosmetic prepaartion of the vanishing cream type, adapted for application to the face, said preparation being essentially devoid of the tendency to lather, comprising stearic acid, water, soap, and a proportion of a member selected from the group consisting of glycols and polyglycerols, partially esterified with a higher molecular weight carboxylic acid, the water being present in predominating amounts.

BENJAMIN R. HARRIS.